United States Patent Office 3,306,750
Patented Feb. 28, 1967

3,306,750
POLYMERIC HARDENERS FOR GELATIN
Louis M. Minsk and Hyman L. Cohen, Rochester, N.Y., assignors to Eastman Kodak Company, Rochester, N.Y., a corporation of New Jersey
No Drawing. Filed Jan. 17, 1966, Ser. No. 520,866
13 Claims. (Cl. 96—111)

This application is a continuation-in-part of Minsk and Cohen application Serial No. 214,815, filed August 6, 1962, now abandoned.

This invention relates to hardeners for gelatin either when used as such or when used as the carrier for silver halide in photographic emulsions. These hardeners are in the form of polymeric linear chains carrying both carboxyl and aldehyde radicals.

Various hardeners for gelatin have been suggested such as in the preparation of photographic products. Many photographic products contain several gelatin layers in sandwich form and it is often desirable to differentially harden these layers to a different degree determined by the task that each layer is to perform. The simple organic hardeners are prone to migrate from layer to layer, hence, differential hardening is difficult to achieve. As a result of this migration, the various layers of the photographic products tend to harden equally.

One means of anchoring the hardening function in a compound to be used for this purpose has been to unite a radical or grouping of high molecular weight with a radical or grouping of lower molecular weight which exerts a hardening effect. In the present invention, the prevention of migration is achieved by the use of a polymeric hardener in the gelatin composition.

One object of our invention is to provide hardeners for gelatin which resist migration from the layer in which they are present to an adjacent layer. Another object of our invention is to provide polymeric hardeners for gelatin having a polymeric chain which acts as a ballast for hardening groupings attached thereto. A further object of our invention is to provide polymers in which a large number of hardening sites may be attached to the backbone of the hardener. A still further object of our invention is to provide polymeric hardeners which are suitable in aqueous systems such as those in which gelatin is normally used and which are compatible with gelatin both wet and dry. A still further object of our invention is to provide polymeric hardeners for gelatin containing both carboxyl groups and, connected to the chain by an intermediate hetero linkage, aldehyde radicals. Other objects of our invention will appear herein.

We have found that polymeric hardeners having a linear polymeric chain backbone and substituents thereon which provide (1) carboxyl groups and (2) terminal aldehyde groups connected to said chain by a hetero linkage are resistant to migration from one gelatin layer to another when used therein. These polymers incorporated in gelatin or in compositions containing gelatin such as silver halide emulsions will provide the layers coated out therefrom with good resistance to melting and swell. The hardening agents in accordance with our invention have a hardening effect on gelatin when used therewith in almost any proportion but a proportion of at least 1% based on the gelatin is ordinarily most desirable. The optimum range for the use of our hardeners in gelatin compositions is ordinarily 5-10%, based on the weight of the gelatin.

In its broadest aspects our invention relates to the use as hardeners for gelatin of polymers of which the linear portion is a linear polymeric chain having the structure of an addition polymer of the polyhydrocarbon type or the structure of a condensation polymer such as of a polypeptide for instance gelatin (recurring CO—NH units), of a polyanhydroglucose, for instance cellulose or of a polyamide, for instance nylon. The polymeric chain or backbone should have appended thereto reactive groups such as hydroxyl, amino, carboxy halide or anhydride through which the aldehyde groups are attached to the chain.

The hardeners in accordance with our invention are polymers having substituents on the recurring units supplying carboxyl and aldehyde radicals connected to the recurring units through a hetero chain consisting of at least 2 atoms at least one of which is carbon. It is desirable that these hardeners have a carboxyl content of at least 3% to insure water solubility and compatibility with gelatin. They should also have at least 2% of aldehyde radicals connected to the chain by means of a hetero linkage. Polymers having the above-described characteristics are useful as non-migrating hardeners for gelatin.

Some compounds which illustrate hardeners of this type are the following:

A.

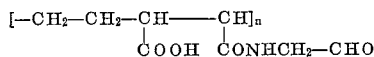

$n$ being at least 20.

Copoly(ethylene-N-aldehydomethyl maleamic acid)

B. Copoly[vinyl acid succinate-(vinyl-N-formylmethyl carboxamidomethyl)carbamate]

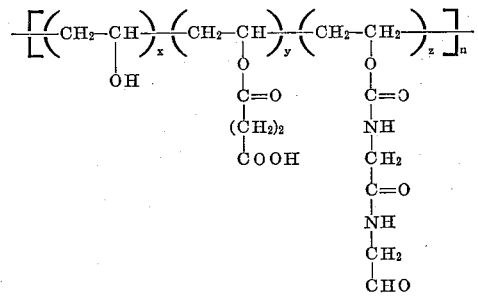

$n$=at least 20.

C. Copoly[ethylene-(4-formylbutyl) acid maleate]

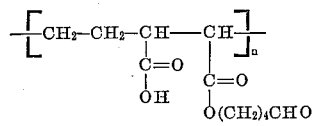

$n$=at least 20.

Samples of Compounds A and B listed above were added to separate portions of a high speed gelatin-silver bromoiodide photographic emulsion which had been panchromatically sensitized with a cyanine dye. The emulsion used contained 245 grams of gelatin per mole of silver halide. The emulsion samples containing A were coated on a cellulose acetate film support at a rate of 430 mg. of silver per square foot. The emulsion samples containing B were coated on cellulose acetate film support at a coverage of 459 mg. of silver and 980 mg. of gelatin per square foot. The coatings were compared with controls without hardener. A sample of each coating was exposed on an Eastman 1B sensitometer, processed for 5 minutes in Kodak DK-50 developer, fixed, washed and dried. The results obtained with the samples containing A against a control were as follows:

| Hardener | G./100 g. of gelatin | Rel. Speed | Gamma | Fog | Melting Point, °F. | Percent Swell [1] |
|---|---|---|---|---|---|---|
| Control | | 100 | 1.08 | 0.11 | 88 | 657 |
| A | 5.0 | 95 | 0.97 | 0.15 | 93 | 470 |
| A | 10.0 | 83 | 0.80 | 0.26 | 183 | 327 |

[1] Swell was determined after a strip had been immersed in distilled water at 68° F., the thickness of the layer dry being taken as 100%.

The results obtained in the samples containing B as compared with a control were as follows:

| Hardener | Concentration, Percent of— | | Percent Swell in— | | |
|---|---|---|---|---|---|
| | G./Ag mole | Gelatin | DK-50 | F-5 [1] | $H_2O$ |
| None | 0 | 0 | 1,200 | 530 | 970 |
| B | 7.2 | 3 | 1,000 | 480 | 810 |
| B | 14.4 | 6 | 1,100 | 490 | 760 |
| B | 24.0 | 10 | 840 | 390 | 590 |

[1] Fixing bath, acidified thiosulfate solution.

The lower speeds in the emulsion which had been hardened appears to be due to some slowing down of development rate, as hardening action in general does decrease the permeability of an emulsion layer to developer solution.

Examples of preparing polymeric hardeners useful in the compositions of the invention are as follows:

*Example 1.—Copoly(ethylene-N-aldehydomethyl maleamic acid)*

A solution of 10 grams (0.08 mole) of ethylene-maleic anhydride copolymer in 100 ml. of acetone was tumbled for 3 days with 10.8 grams (0.08 mole) of aminoacetaldehyde diethyl acetal. The viscosity of the solution increased markedly. The product was precipitated in ether, washed with ether and vacuum dried giving 20 grams of product. This polymeric product was dissolved in a mixture of 200 ml. of water and 200 ml. of dimethylformamide and the solution was tumbled with 50 grams of ion exchange resin (Amberlite IR 120) for 3 days. The solution was filtered and the filtrate was added to 750 ml. of water containing 2 grams of sodium hydroxide. The solution was dialyzed overnight and was then evaporated down to 100 ml. and used for addition to gelatin compositions for hardening purposes. This product had a nitrogen content of approximately 5%, based on the weight of the entire product.

*Example 2.—Copoly[vinyl acid succinate-(vinyl-N-formylmethyl carboxamidomethyl)carbamate]*

A solution of 8.8 grams (0.2 mole) of poly(vinyl alcohol) in 150 ml. of hexamethylphosphoramide was mixed with 14.2 grams (0.11 mole) of ethyl isocyanatoacetate. This mixture was allowed to stand at room temperature overnight and was then heated in a 60° bath for 24 hours. The solution was precipitated with ether and the precipitate was washed with ether and vacuum dried. A soft solid was obtained which was dissolved in methanol, precipitated in ether, washed and vacuum dried. The yield was 20 grams.

18 grams (0.061 mole) of the intermediate thus prepared were dissolved in 175 ml. of methylcarbitol which solution was mixed with 18 grams (0.15 mole) of aminoacetaldehyde diethyl acetal and the mixture was heated at 150° C. for 3 hours. The mixture was cooled, precipitated into ether and the precipitate was washed with ether and vacuum dried. The yield was 14 grams.

13 grams of polymer thus prepared was dissolved in 130 ml. of dimethylformamide and 13 grams of pyridine and then 13 grams of succinic anhydride was added thereto. The solution was heated on a steam pot for two hours and was then cooled. The material obtained was water soluble. It was diluted with 100 ml. of water and 30 ml. of concentrated hydrochloric acid and the solution was allowed to set overnight. A solution of 17 grams of sodium hydroxide in 50 ml. of water was added, the solution was diluted to 900 ml. with water and was dialyzed through a cellophane membrane against distilled water overnight. The resulting solution was concentrated on a steam bath under vacuum to 110 grams giving a solution containing 8% solids. The material in solution was copoly[vinyl acid succinate-(vinyl-N-formylmethyl carboxamidomethyl)carbamate], designated as B herein, in the form of its partial sodium salt.

*Example 3.—Copoly[ethylene-(4-formylbutyl) acid maleate]*

15 grams (0.12 mole) of copoly[ethylene-maleic anhydride], 15 grams (0.15 mole) of 5-hydroxypentanal and 12 grams (0.15 mole) of pyridine were all dissolved in 150 ml. of dimethylformamide which solution was heated for 1 hour on a steam bath. The mixture was cooled and was poured into 2 liters of ether containing 30 ml. of glacial acetic acid forming a precipitate of copoly[ethylene-(4-formylbutyl) acid maleate]. The precipitate was washed with ether and was vacuum dried. The yield was 15 grams. The product thus obtained was dissolved in 150 ml. of water containing 1.5 grams of sodium hydroxide forming the partial sodium salt of the polymer. A gelatin film containing 5 grams of gelatin and 1 gram of the polymer when dried dissolved in water at 60° while the plain gelatin dissolved at 39° showing that the presence of the polymer in the gelatin increased its resistance to hot water indicating hardening.

The hardeners in accordance with our invention are of special value for use in photographic products in which a plurality of gelatin layers are applied one over the other because of their resistance to migration from layer to layer. The photographic products may employ various types of supports such as cellulose ester film, film of other types or paper supports, the type of support used being optional with the individual operator. In addition to the hardening of photographic emulsion layers, also contemplated is the hardening of gelatin layers employed as overcoatings, subcoats, antistatic layers, antihalation layers or the like which layers may contain pigments, dyes or any of the other addenda which have been incorporated in gelatin layers in the making of photographic products.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A composition of matter comprising gelatin containing an effective amount of a hardener comprising a compound composed of a polymeric linear chain having appended thereto at least 3% of carboxyl in amount to insure water solubility and compatibility with gelatin and at least 2% of GHO connected to said chain by a hetero linkage consisting of at least 2 atoms at least one of which is carbon and the other is nitrogen or oxygen.

2. The composition of claim 1 in which the composition comprising gelatin is a gelatin-silver halide photographic emulsion.

3. The composition of claim 1 in which the hardener is copoly(ethylene-N-aldehydomethyl maleamic acid).

4. The composition of claim 1 in which the hardener is copoly[vinyl acid succinate-(vinyl-N-formylmethyl carboxamidomethyl)carbamate].

5. The composition of claim 1 in which the hardener is copoly[ethylene-(4-formylbutyl) acid maleate].

6. The composition of claim 1 which comprises a gelatin-silver halide photographic emulsion containing copoly(ethylene-N-aldehydomethyl maleamic acid), as a hardener therein.

7. A photographic element comprising a support having thereon at least one layer composed of gelatin containing a hardener comprising a compound composed of a polymeric linear chain having appended thereto at least 3% of carboxyl in amount to insure water solubility and compatibility with gelatin and at least 2% of CHO connected to said chain by a hetero linkage consisting of at least 2 atoms at least one of which is carbon and the other is nitrogen or oxygen.

8. The element of claim 7 in which one gelatin layer is composed of a gelatin-silver halide photographic emulsion.

9. The element of claim 7 in which one gelatin layer contains copoly(ethylene - N - aldehydomethyl maleamic acid) as a hardener therein.

10. A compound composed of a polymeric linear chain having appended thereto at least 3% of carboxyl in amount to insure water solubility and compatibility with gelatin and at least 2% of CHO connected to said chain by a hetero linkage consisting of at least 2 atoms at least one of which is carbon and the other is nitrogen or oxygen.

11. As the compound of claim 10 copoly(ethylene-N-aldehydomethyl maleamic acid).

12. As the compound of claim 10 copoly[vinyl acid succinate - (vinyl-N-formylmethyl carboxamidomethyl) carbamate].

13. As the compound of claim 10 copoly[ethylene-(4-formlybutyl) acid maleate].

No references cited.

NORMAN G. TORCHIN, *Primary Examiner.*

J. H. RAUBITSCHEK, *Assistant Examiner.*